United States Patent

Tanaka et al.

[11] Patent Number: 5,575,634
[45] Date of Patent: Nov. 19, 1996

[54] SEALING MATERIAL FOR SCROLL-TYPE COMPRESSOR

[75] Inventors: Tadashi Tanaka; Hidehiko Tamura; Nobutaka Hiramatsu; Toshio Egami; Teruo Abe, all of Nagoya, Japan

[73] Assignee: Daido Metal Company Ltd., Nagoya, Japan

[21] Appl. No.: 528,974

[22] Filed: Sep. 15, 1995

[30] Foreign Application Priority Data

Oct. 25, 1994 [JP] Japan .................................. 6-286064

[51] Int. Cl.$^6$ .................................................. F01C 1/04
[52] U.S. Cl. ...................... 418/55.4; 418/179; 277/96.2
[58] Field of Search ............................. 418/55.4, 179; 277/96.2, 204, DIG. 6; 524/413, 546

[56] References Cited

U.S. PATENT DOCUMENTS 4,580,790  4/1986  Doose ..................... 277/228
4,722,676  2/1988  Sugimoto ................. 418/55

FOREIGN PATENT DOCUMENTS

| 50-32512 | 3/1975 | Japan . |
| 55-81296 | 6/1980 | Japan . |
| 3-273083 | 4/1991 | Japan . |
| 4-5492 | 1/1992 | Japan . |
| 6-25645 | 2/1994 | Japan . |

*Primary Examiner*—Charles G. Freay
*Attorney, Agent, or Firm*—Browdy and Neimark

[57] ABSTRACT

A sealing material for a scroll-type compressor consists essentially of, by weight, more than 20 and up to 40% PAN-system carbon fiber, 1 to 15% polytetrafluoroethylene resin, and the balance of polyphenylene sulfide resin. Further, not more than 10% hard particles formed of a copper alloy are added to the foregoing components. Thus, there can be provided a sealing material which can be applied to scroll members of a high surface hardness which have undergone Tufram process or Ni-P plating.

12 Claims, 1 Drawing Sheet

SEALING MATERIAL FOR SCROLL-TYPE COMPRESSOR

FIELD OF THE INVENTION

The present invention relates to a sealing material used for scroll members of a scroll-type compressor.

BACKGROUND OF THE INVENTION

As is well known, a scroll-type compressor comprises a pair of scroll members each of which comprises a base plate and a perpendicular wall having a vortex shape formed on the base plate the perpendicular walls defining a compression. One of the pair is an orbiting scroll member, and the other is a stationary scroll member. These two scroll members are located to match with each other. By eccentrically revolving the orbiting scroll member, a fluid is compressed in the compression chamber enclosed with the vortex walls. In such a scroll-type compressor, as disclosed in JP-A-50-32512, JP-A-55-81296 and so forth, a long sealing material in a vortex shape is provided in a receiving groove which is formed on the end surface of the respective perpendicular wall, and the sealing material contacts with the bottom surface of a compression chamber of the other upright wall, thereby maintaining fluid tightness of the compression chamber.

Since a sealing property and a sliding-contact property of such a sealing material greatly affect the operational efficiency of the compressor, various researches have been conventionally made on sealing materials.

For example, a sealing material which can be molded by injection is disclosed in JP-A-3-273083, and consists of, by weight, 35 to 80% polyphenylene sulfide resin (hereinafter referred to as PPS), 10 to 35% fluorocarbon polymer, 5 to 15% pitch-system carbon fiber, and 5 to 15% organic powder. This sealing material is excellent in sliding-contact properties such as wear resistance, and moldability when it is used for scroll members made of an aluminum alloy. The pitch-system carbon fiber is employed because polyacrylonitrile-system PAN-system, carbon fiber can not provide a sufficient sealing property and has inferior moldability.

Also, JP-A-4-5492 and JP-A-6-25645 disclose sealing materials comprising liquid crystal polymer to which vitreous carbon (carbon whose fractured face has glassy luster: see JP-A-4-5492) or fluororesin and carbon fiber are added.

Recently, however, concerning scroll-type compressors, investigations have been made for using scroll members the surfaces of which are subjected to Tufram process or Ni-P plating to provide a surface hardness of not less than HV 500, thereby obtaining a high compression rate. When used for such hard scroll members, the above-mentioned conventional sealing materials involve a problem that they do not have an adequate wear resistance.

Summary of the Invention

It is a primary object of the invention to provide a sealing material which can be applied to scroll members of a high hardness, by forming the sealing material consisting of PPS, PAN-system carbon fiber, and polytetrafluoroethylene resin (hereinafter referred to as PTFE).

Therefore, according to a first feature of the invention, there is provided a sealing material for a scroll-type compressor, consisting of, by weight, more than 20 and up to 40% PAN-system carbon fiber, 1 to 15% polytetrafluoroethylene resin, optionally not more than 10% hard particles, and the balance of polyphenylene sulfide resin.

Further, according to a second feature of the invention, the hard particles are formed of a copper alloy.

Either a cross-linking type or a linear type of PPS comprising not less than 70 mol % of repetition units shown in the following equation (1) can be employed. Especially, PPS comprising not less than 90 mol % of repetition units is preferred. PPS comprising less than 70 mol % of repetition units is inadequate in heat resistance.

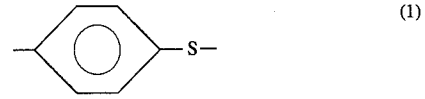
(1)

Commercial products of PPS such as Ryton P-4 produced by Phillips Co., Ltd. and so on can be used.

As compared with a sealing material containing pitch-system carbon fiber, the sealing material PAN-system carbon fiber exhibits superior wear resistance, and also, shrinkage of the sealing material during molding is smaller. Preferably, the length of PAN-system carbon fiber is not greater than 1 mm. When it exceeds 1 mm, flow rate of the sealing material in a molten state is insufficient, so that molding of the sealing material will be difficult.

The content of PAN-system carbon fiber is from more than 20 wt % to 40 wt %. When it is less than 20 wt %, the load capacity, wear resistance and creep property of the sealing material can not be adequately improved, and further, the shrinkage is increased. When the content exceeds 40 wt %, the moldability is deteriorated. Preferably, the content of PAN-system carbon fiber is 25 to 35 wt % especially in respect of the wear resistance.

As the PAN-system carbon fiber, there can be employed commercial products such as Torayca MLD-3, Torayca MLD-300 and Torayca MLD-1000-E (Trade Mark) produced by TORAY INDUSTRIES, INC., and Besifight HTA-CMF-0040-E, Besifight HTA-CMF-0160-E and Besifight HTA-CMF-1000-E (Trade Mark) produced by TOHO RAYON CO., LTD.

PTFE having an average particle diameter of about 25 μm is preferred in regard to dispersion property.

The PTFE content is 1 to 15 wt %. When it is less than 1 wt %, sliding-contact property and anti-seizure property of the sealing material can not be sufficiently improved. On the other hand, when it exceeds 15 wt %, strength of the sealing material itself is decreased, and the shrinkage is increased. Preferably, the PTFE content is 5 to 10 wt %.

As the PTFE, there can be employed commercial products such as TLP10F1-1, TLP-10 and MP1300 (Trade Mark) produced by Mitsui Dupont•Fluorochemicals Co., Ltd., Lublon L-5 and L-2 (Trade Mark) produced by DAIKIN INDUSTRIES, LTD., and KTL-500F (Trade Mark) produced by Kitamura.

According to the first feature, with respect to the hard particles, the sealing material includes not more than 10 wt % thereof, so that load capacity and wear resistance can be further improved. Preferably, the hard particles have a diameter of 1 to 50 μm. When the content of hard particles exceeds 10 wt %, the moldability of the sealing material is deteriorated.

As the hard particles, there can be employed metal powder particles of a copper alloy such as bronze, other metals, metallic oxides of PbO, $Al_2O_3$ and so on, or metallic compounds of $PbF_2$, PbS and so on. In regard to the wear resistance, however, powder of a copper alloy is particularly preferred.

EXAMPLE

The preferred embodiments of the present invention will be hereinafter described.

Firstly, descriptions will be given on raw materials employed for invention examples and comparative examples.

PPS: Ryton P-4 (Trade Mark) produced by Phillips Co., Ltd.

PTFE: Lublon L-5 (Trade Mark) produced by DAIKIN INDUSTRIES, LTD.

PAN-system carbon fiber: Torayca Milled Fiber MLD-300 (Trade Mark) produced by TORAY INDUSTRIES, INC.

Pitch-system carbon fiber: Kureha M201F (Trade Mark) produced by Kureha Chemical Industry Co., Ltd.

Aramid fiber: Technora T-320 (Trade Mark) produced by TEIJIN LTD.

Powder of hard particles: $PbF_2$ (produced by Hashimoto Kasei K.K.), $Al_2O_3$ (produced by Nikkei Kako K.K.), bronze (produced by Fukuda Metal Foil & Powder Co., Ltd.)

Figure 1:
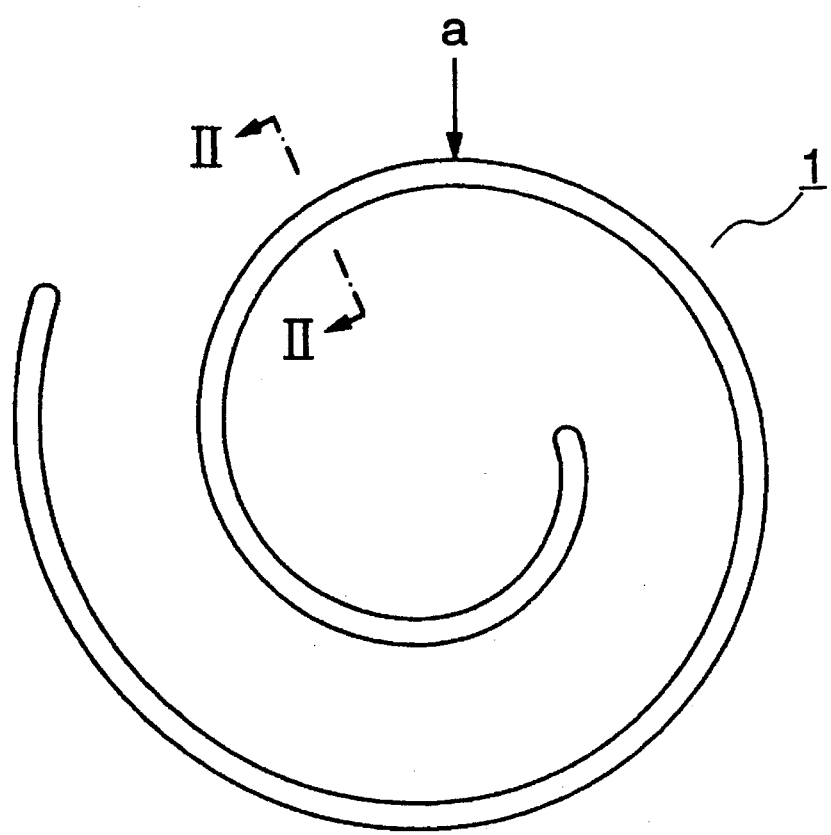
FIG. 1 is a plane view of a sealing material.

The foregoing raw materials were mixed to have compositions shown in Table 1 by weight %, sufficiently blended in a dry condition by a Henshel mixer, and extruded while melting and kneading with a 40 mm-diameter extruder (Extruding temperature: 310° C.), so as to be produced as uniform pellets. Next, the pellets were molded by an injection molding machine in which a cylinder temperature was 300° to 330° C. and a molding die temperature was 140° C., thereby obtaining invention examples 1 to 7 and comparative examples 8 to 12. For frictional wear tests, there were molded cylindrical specimens having an outer diameter of 25.6 mm, an inner diameter of 20.0 mm and a length of 20.0 mm. Further, for shrinkage tests, there were molded sealing materials 1 of a vortex shape along an involute curve, as shown in FIG. 1, which had a width of 2.7 mm, a thickness of 1.4 mm and a length of 250 mm.

TABLE 1

| Raw Material wt % | Specimen No. | | | | | | | | | | | |
|---|---|---|---|---|---|---|---|---|---|---|---|---|
| | Invention Example | | | | | | | Comparative Example | | | | |
| | 1 | 2 | 3 | 4 | 5 | 6 | 7 | 8 | 9 | 10 | 11 | 12 |
| PPS | 65 | 60 | 70 | 65 | 50 | 65 | 65 | 80 | 80 | 60 | 65 | 60 |
| PTFE | 15 | 10 | 5 | 5 | 10 | 5 | 5 | 10 | 10 | 10 | 15 | 10 |
| PAN-system Carbon Fiber | 20 | 30 | 25 | 25 | 40 | 25 | 25 | 10 | | | | |
| Pitch-system Carbon Fiber | | | | | | | | | 10 | 30 | 20 | |
| Aramid Fiber | | | | | | | | | | | | 30 |
| $PbF_2$ | | | | 5 | | | | | | | | |
| $Al_2O_3$ | | | | | | 5 | | | | | | |
| Bronze | | | | | | | 6 | | | | | |

Figure 2:
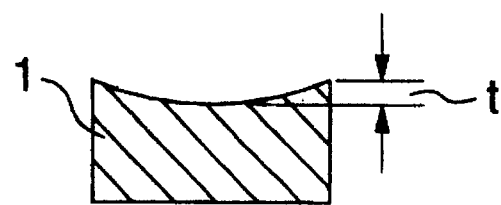
FIG. 2 is a cross-sectional view of the sealing material taken along arrows II—II.

With the invention examples 1 to 7 and comparative examples 8 to 12, frictional wear tests were performed under the test conditions shown in Table 2, and test results shown in Table 3 were obtained. In this table, the shrinkage is a difference t between a height of lateral sides and a height of the center of an intermediate portion a of a molded sealing material 1, as shown in FIG. 2.

TABLE 2

| Test Condition | |
|---|---|
| Test Machine | Suzuki-Type Frictional Wear Test Machine |
| Test Specimen Size | Outer Diameter 25.6 mm Inner Diameter 20.0 mm Length 20.0 mm |
| Load | 1.96 MPa (20 kgf/cm$^2$) |
| Peripheral Speed | 2.5 m/sec |
| Test Time | 4 hours |
| Lubrication Oil | Suniso 4GS |
| Lubrication Oil Temperature | 100° C. |
| Shaft Material | JIS AC8C + Tufram Process |

TABLE 3

| | Invention Example | | | | | | | Comparative Example | | | | |
|---|---|---|---|---|---|---|---|---|---|---|---|---|
| | 1 | 2 | 3 | 4 | 5 | 6 | 7 | 8 | 9 | 10 | 11 | 12 |
| Friction Coefficient | 0.04 | 0.05 | 0.04 | 0.05 | 0.05 | 0.04 | 0.05 | 0.07 | 0.07 | 0.09 | 0.07 | 0.10 |
| Wear Loss (μm) | 27 | 23 | 24 | 19 | 20 | 19 | 16 | 39 | 56 | 51 | 54 | 99 |
| Shrinkage (μm) | 5.0 | 3.9 | 4.3 | 4.1 | 3.1 | 4.0 | 4.0 | 5.5 | 8.4 | 7.0 | 7.8 | 11.1 |

As is understood from the results shown in Table 3, comparative examples 9 to 11 including pitch-system carbon fiber exhibited wear losses of 51 to 56 μm which were twice or more larger than wear losses of the invention examples 1 to 7. A comparative example 12 including aramid fiber instead of PAN-system carbon fiber exhibited a wear loss of 99 μm and was extremely inferior in wear resistance. A comparative example 8 including 10 wt % PAN-system carbon fiber exhibited a wear loss as high as 39 μm.

Moreover, as compared with an invention example 3 to which hard particles were not added, invention examples 4, 6 and 7 including hard particles exhibited low wear losses.

Especially, a wear loss of the invention example 7 including hard particles of bronze was remarkably low.

As has been described heretofore, the sealing material consists essentially of, by weight, from more than 20 wt % to 40% PAN-system carbon fiber, 1 to 15% polytetrafluoroethylene resin, and the balance of polyphenylene sulfide resin. Thus, there can be provided a sealing material for a scroll-type compressor which exhibits favorable sliding-contact properties, especially an excellent wear resistance, with respect to scroll members having a hardness of not less than HV 500.

Moreover, there can be provided a sealing material for a scroll-type compressor which is even more excellent in wear resistance by adding not more than 10% hard particles thereto.

What is claimed is:

1. A sealing material for a scroll-type compressor, consisting of, by weight, more than 20 and up to 40% PAN-system carbon fiber, 1 to 15% polytetrafluoroethylene resin, optionally not more than 10% hard particles, and the balance of polyphenylene sulfide resin.

2. A sealing material for a scroll-type compressor according to claim 1, characterized in that the hard particles are present and are formed of a copper alloy.

3. A sealing material according to claim 1 wherein said polyphenylene sulfide resin is a cross-linking resin or a linear PPS resin comprising not less than 70 mol % of repetition units of formula (1)

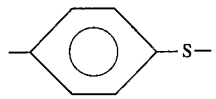 (1)

4. A sealing material according to claim 3 wherein said PPS resin comprises not less than 90 mol % of said repetition units.

5. A sealing material according to claim 3 wherein said carbon fiber has a length no greater than 1 mm.

6. A sealing material according to claim 5 wherein the content of said carbon fiber is 25–35 wt %.

7. A sealing material according to claim 3 wherein the content of said carbon fiber is 25–35 wt %.

8. A sealing material according to claim 7 wherein said polytetrafluoroethylene resin has an average particle diameter of about 25 μm and is present in an amount of 5–10 wt %.

9. A sealing material according to claim 3 wherein said polytetrafluoroethylene resin has an average particle diameter of about 25 μm and is present in an amount of 5–10 wt %.

10. A sealing material according to claim 2 wherein said hard particles of a copper alloy have a diameter of 1–50 μm and are formed of bronze.

11. A sealing material according to claim 1 wherein said hard particles are present and have a diameter of 1–50 μm.

12. A sealing material according to claim 11 wherein said polyphenylene sulfide resin is a cross-linking resin or a linear PPS resin comprising not less than 90 mol % of repetition units of formula (1)

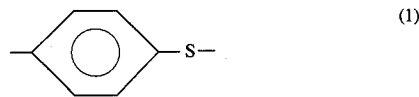

the length of said carbon fiber is not greater than 1 mm, the quantity of said carbon fiber is 25–35 wt %, and the polytetrafluoroethylene content is 5–10 wt %.

* * * * *